May 5, 1970     H. L. FITCH     3,509,961

UNDERWATER SEISMIC EXPLORATION

Filed Oct. 30, 1968     3 Sheets-Sheet 1

HOMER L. FITCH
INVENTOR.

BY *William F. Smith*

AGENT

HOMER L. FITCH
INVENTOR.

BY *William J. Smith*

AGENT

May 5, 1970          H. L. FITCH          3,509,961

UNDERWATER SEISMIC EXPLORATION

Filed Oct. 30, 1968          3 Sheets-Sheet 3

HOMER L. FITCH
INVENTOR.

BY *William J. Smith*

AGENT

United States Patent Office 3,509,961
Patented May 5, 1970

1

3,509,961
UNDERWATER SEISMIC EXPLORATION
Homer L. Fitch, Mount Arlington, N.J., assignor to Hercules Incorporated, Wilmington, Del., a corporation of Delaware
Continuation-in-part of application Ser. No. 665,075, Sept. 1, 1967. This application Oct. 30, 1968, Ser. No. 773,371
Int. Cl. G01v 1/38, 1/12
U.S. Cl. 181—.5                                   6 Claims

ABSTRACT OF THE DISCLOSURE

A system for underwater seismic exploration in which a liquid-containing, expandable and contractable container disposed in water has an explosive charge detonated therein whereby the primary explosive pulse is enhanced and the secondary pulsations decreased to give an improved source of seismic waves.

---

This application is a continuation-in-part of my copending application Ser. No. 665,075, filed Sept. 1, 1967.

This invention relates to improvements in the art of underwater seismic exploration. More particularly, the invention relates to an improved source of seismic waves in which the bubble pulse is suppressed when a charge of explosive is detonated underwater.

It has long been known that when an explosive charge initially explodes underwater, it sends out a primary explosive pulse from which useful information concerning subterranean strata is derived. It is further known, however, that an explosive charge which is detonated at an appreciable depth below the surface of the water tends to pulsate and emit secondary pulses following the primary pulse. These secondary pulses are caused by the gaseous bubble which is created by detonation of the explosive charge and which expands and then contracts, whereupon each contraction gives rise to an additional energy pulse. These secondary pulses are undesirable in that the energy they generate is reflected from subsurface interfaces in a manner similar to that resulting from the energy of the primary pulse, and the arrivals of the reflected secondary pulse energy tend to interfere with the desired primary pulse energy essential to an accurate seismic record and reading.

In order to solve the bubble or secondary pulse problem, efforts have been made to enclose the charge of explosive in a perforated envelope, such as an apertured or screened steel sphere or other configuration. With this arrangement, however, the sphere or other configuration has its surfaces spaced from the explosive charge by a distance approximately equal to the maximum radius of the gaseous cavity formed in the water due to the primary explosive pulse. Furthermore, with this arrangement, it is set forth that the energy of the primary shock wave is affected only slightly by the screen since it is associated with a phenomenon unrelated to volume flow of water through the mesh. It is reasoned that the perforated envelope withdraws energy from the oscillating system on expansion and contraction of the explosive bubble and that the secondary pulses, which are emitted as the bubble ends its contraction, are decreased in magnitude because the explosive bubble does not contract to as small a diameter, part of the energy of the oscillation having been dissipated by the envelope. Thus, it is further set forth

2 that although the primary and secondary shock waves are both emitted at the same place, the primary shock wave is emitted before energy is dissipated by the mesh. It is evident that the foregoing arrangement is not conducive to operation of an explosive seismic system in a simple, facile and economical manner.

It is, therefore, an object of the present invention to provide an improved explosive seismic system in which the apparatus is manufactured and the method practiced in a simple, facile and economical manner for enhancement of the primary shock energy and substantial suppression of the bubble or secondary pulse energy.

It is a further object of the present invention to provide a method for attenuating thrust or bubble energy associated with an underwater explosion and at the same time transforming a portion of the attenuated thrust or bubble energy into useful shock or primary energy.

It is still a further object of the present invention to provide for automatically and continuously feeding and initiating explosive charges in the improved explosive seismic system constituting this invention as well as provide novel seismic cartridges therefor.

Other objects of the invention will appear hereinafter the novel features and combinations being set forth in the appended claims.

Generally described, in accordance with the present invention it has been found that the objects are accomplished by providing an impervious or substantially normally impervious expandable and contractable container containing liquid and of sufficient size and wall thickness to contain the gas pressure generated by an explosive charge placed centrally within the container and detonated. Enhancement of shock energy is accomplished by confinement of the bubble energy as the impervious expandable container expands. The size of the charge used and the structural design of the container with regard to type of material, wall thickness and the elimination of stress concentrations are, of course, necessary considerations to successful operation of the invention.

More specifically, the present invention contemplates a system for generating seismic disturbances in a body of water, said system comprising in combination; a storage means for storing a supply of explosive charges; an expandable and contractible container submerged in the body of water; conduit means for individually loading the explosive charges from the storage means to a central position within the container; and percussion initiating means for initiating each explosive charge within the container to cause said container to pulse thereby enhancing the primary explosive pulse and decreasing the secondary pulsations in the body of water.

Furthermore, the present invention contemplates a seismic cartridge for association with percussion initiating means in an underwater firing system, said cartridge comprising in combination; an elongated cylindrical shell having a percussion fuse cap disposed within the shell at one end thereof and having a high explosive charge disposed at the other end thereof; and a length of detonating fuse extending from the percussion fuse cap to the high explosive charge.

Representative embodiments of the invention have been chosen for purposes of illustration and description and are shown in the accompanying drawings wherein reference symbols refer to like parts wherever they occur.

Figure 1:
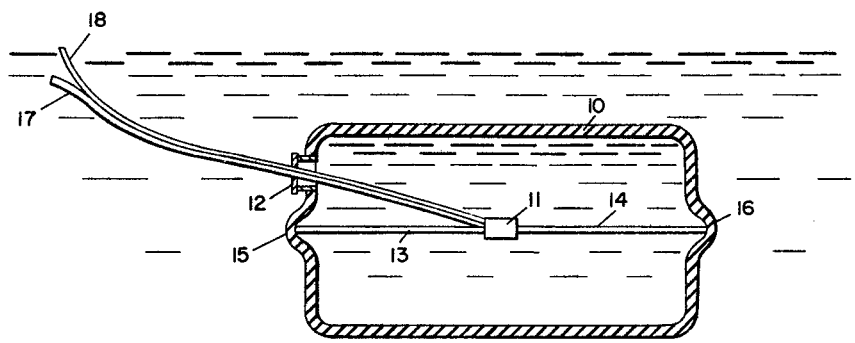
FIG. 1 is a sectional view of experimental apparatus utilized in demonstrating the efficacy of the invention.

In FIG. 1, a liquid-containing, impervious, expandable and contractable container 10 has an explosive charge 11 centrally disposed therein. The container 10 had a bung 12 provided for insertion of the explosive charge 11 into the container and the explosive charge was centered therein by centering rods 13 and 14 which extended into protrusions 15 and 16 provided in the end walls of the container. Leg wires 17 and 18 were connected to the explosive charge 11, extended through the bung 12, and were connected at the other end to a suitable blasting initiator device (not shown). The container 10 was cylindrical and made of rubber and was approximately 2.6 feet long and 1.9 feet in diameter with the end walls thereof being slightly convex. The wall thickness of the container 10 was approximately 0.5 inch. The container 10 was filled with water and immersed in water to a depth of 12.0 feet. Various explosive charges, represented by 11, were shot inside the container 10. Similar explosive charges were shot outside the container 10 in the water at approximately the same depth as the charges inside the container. All explosive charges used in the tests were in the form of booster charges and were detonated by #8 electric blasting caps. Comparative data concerning the various shots are given in the table which follows wherein the designation "Water" means those shots fired under water outside the container and the designation "Water Container" means those shots fired under water inside the container.

Princeton University Press, Princeton, N.J. (1948), pages 228 to 285), and wherein Thrust Energy $$\frac{\frac{K \times T_1^3}{W}}{\frac{K \times T_2^3}{W}} \text{ is equivalent to } \frac{T_1^3}{T_2^3}$$

$K = 0.471568 \times 10^{-2}$
$T =$ Bubble time in milli-seconds (ms.)
$W =$ Weight of charge in grams (gm.)

Comparing the average thrust energy value for the 10 and 20 gram charges shot inside the container to the 10 gram charges shot outside the container in the water, the following is obtained:

$$\frac{\text{Average thrust (bubble) energy in container}}{\text{Average thrust (bubble) in water}} = \frac{206}{626} = .33$$

Thus, it is readily seen that the thrust (bubble) energy from charges shot inside the container has been reduced by two-thirds.

Previous experience has shown that when thrust energy is attenuated by confinement, shock energy is in turn enhanced, since both factors of energy comprise the total available energy of the explosive material which was detonated.

Figure 2:
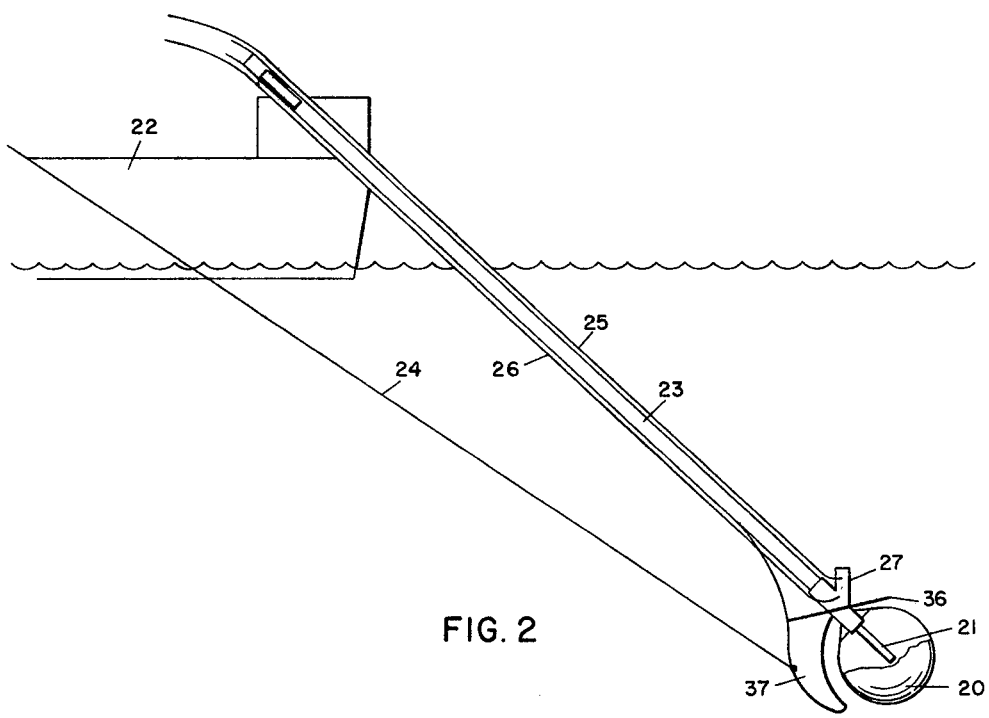
FIG. 2 is a diagrammatic view illustrating the system for generating seismic disturbances in accordance with practice of this invention.
Figure 3:
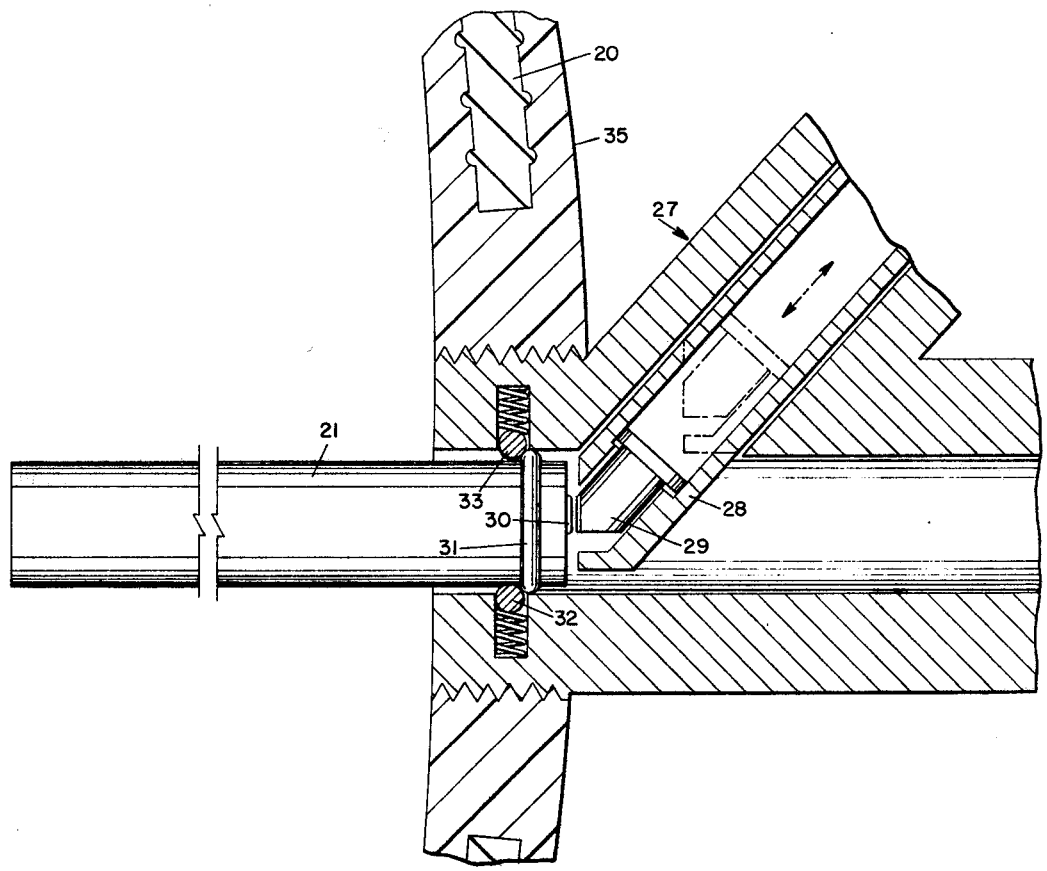
FIG. 3 is an enlarged fragmentary sectional illustrating the firing mechanism interface as employed in the system illustrated in FIG. 2.

Referring now to FIG. 2, in preferred practice for continuous profiling whereby the seismic recording boat moves at a constant speed while recording shots at a predetermined interval, a water-filled pulsing container or sphere 20 containing a seismic cartridge 21 is towed behind a seismic survey boat 22 at a water depth of about 10 to about 40 feet. The towing arrangement comprises a rigid charge transport tube 23, depth control cables 24, hydraulic lines 25 (2 each) and pneumatic lines 26 (2 each). A percussion firing mechanism 27 is interposed and rigidly connected between the transport tube 23 and the pulsing sphere 20. Referring now more particularly to FIG. 3, the percussion firing mechanism 27 has a pneumatic piston 28 operated by pneumatic lines 26 which seal the seismic cartridge 21 in place. A firing pin 29 slidably disposed within the piston 28 is operated by hydraulic lines 25 to impart a percussive blow to a percussion fuse cap 30 which extends into the seismic cartridge 21. Detent means comprising an annular ring 31 and plurality of

TABLE

| | Shot, gms. | Bubble Time (ms.) | $T^3$ Bubble Time (ms.)$^3$ | Energy Calculation | Shot Condition | Effective Thrust Energy (cal./gm.) |
|---|---|---|---|---|---|---|
| 1 | 10 | 49 | $0.11765 \times 10^6$ | $0.55480 \times 10^4$ | Water | 548 |
| 2 | 10 | 51 | $0.13265 \times 10^6$ | $0.62554 \times 10^4$ | do | 626 |
| 3 | 10 | 54 | $0.15746 \times 10^6$ | $0.74253 \times 10^4$ | do | 742 |
| 4 | 10 | 32 | $0.03277 \times 10^6$ | $0.15453 \times 10^4$ | Water container | 155 |
| 5 | 20 | 42 | $0.074088 \times 10^6$ | $0.34938 \times 10^4$ | do | 175 |
| 6 | 20 | 49 | $0.11764 \times 10^6$ | $0.55475 \times 10^4$ | do | 277 |
| 7 | 10 | 50 | $0.12500 \times 10^6$ | $0.58946 \times 10^4$ | Water | 589 |
| 8 | 10 | 35 | $0.04288 \times 10^6$ | $0.20221 \times 10^4$ | Water container | 202 |
| 9 | 454 | 174 | $5.26800 \times 10^6$ | $24.842 \times 10^4$ | Water | 547 |
| 10 | 10 | 36 | $0.04666 \times 10^6$ | $0.22003 \times 10^4$ | Water container | 220 |
| 11 | 40 | 70 | $0.34300 \times 10^6$ | $1.61749 \times 10^4$ | do | 404 |
| 12 | 40 | 81 | $0.53144 \times 10^6$ | $2.50611 \times 10^4$ | Water | 627 |

The above table shows the calculated thrust energies in calories per gram wherein the underwater thrust (bubble) energy calculations were made by the method indicated by Cole (Cole, H. C., Underwater Explosions, spring urged bearings 32 and 33 serve to secure the cartridge 21 in the firing mechanism 27 when ready for firing. The piston 28 and firing pin 29 when in retractable position as shown in phantom outline permits the cartridge 21 to be fully positioned and inserted in the sphere 20 as fed from the transport tube 23. Additionally, a primary vent 34 in the sphere 20 is provided to release any excessive pressures generated in the system (see FIG. 5). The entire firing mechanism 27 is threadedly secured to a mounting flange 35 which in turn is integrally secured to the body of the pulsing sphere 20. A horizontal surface paravane 36 and a vertical surface paravane 37 serving as a guard completes the sphere assembly. Cartridge feeding and firing mechanisms suitable for use in conjunction with the present invention are disclosed in copending application Ser. No. 724,942, filed Apr. 29, 1968 to Homer L. Fitch et al. Accordingly, such mechanisms will not be further elaborated here.

Figure 4:
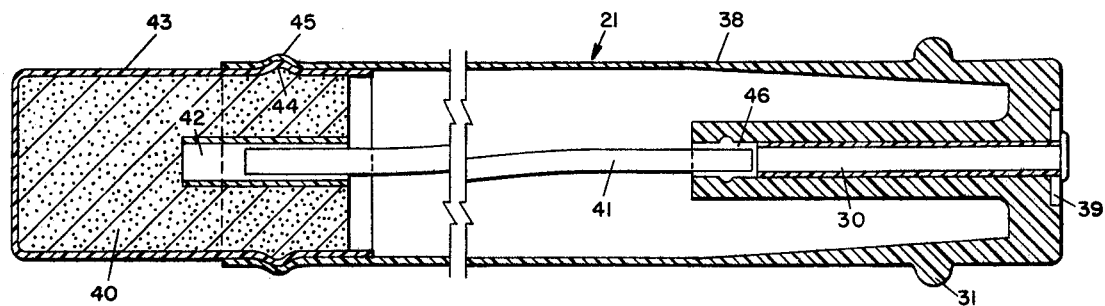
FIG. 4 is an enlarged sectional view illustrating the seismic cartridges utilized in the system illustrated in FIG. 2 and in conjunction with the firing mechanism of FIG. 3.

Referring now to FIG. 4, a preferred embodiment of the seismic cartridge 21 has an elongated cylindrical shell 38 of plastic material having delayed action water solubility. The percussion fuse cap 30 is disposed within the shell 38 at one end thereof with a metal washer 39 externally positioned at the end of the shell and serving as an anvil for the percussion head of the cap which protrudes from the shell. A high explosive charge 40 is disposed at the other end of the shell 38 and a length of detonating fuse 41 such as Primacord extends from the percussion fuse cap 30 to the high explosive charge 40. The explosive charge 40 may be any of a variety of materials detonable by detonating fuse and is provided with a well 42 for insertion of the fuse 41. The explosive charge 40 has a shell 43 of the same material as shell 38 and both shells at the open end thereof have a compatible detent ring 44 and 45, respectively; for interlocking to form a unitary structure. Assembly of the seismic cartridge 21 is as follows; the detonating fuse 41 at one end is crimped into a well 46 which is adapted to receive the percussion fuse cap 30. The other end of the fuse 41 is inserted into the well 42 within the explosive charge 40 and the charge is then inserted into the shell 38 and snapped into place with the detent rings 44 and 45 in full engagement. Immediately prior to use, the percussion fuse cap 30 is inserted into the well 46 and the seismic cartridge 21 is then ready for firing.

The seismic cartridges made as described above were about 2 inches in diameter and from about 20 to 26 inches in length. Since the sphere was a molded resilient structure having a wall thickness of about 2 inches and a diameter of about 52 inches, the high explosive charge in all instances was near the center of the sphere at the time of detonation. This prevented any unbalanced explosive force from being transmitted to the wall of the sphere.

Figure 5:
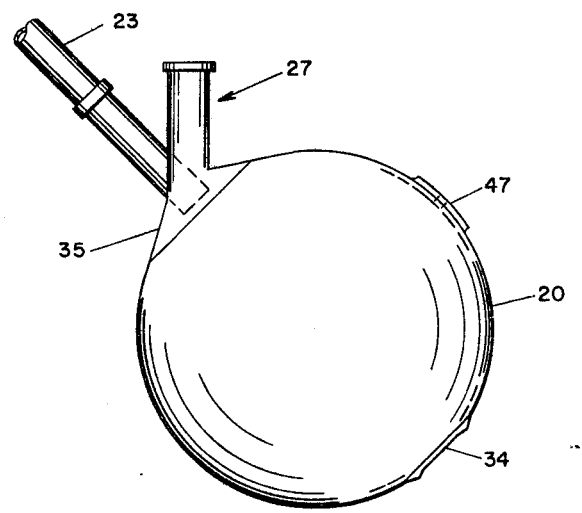
FIG. 5 is an elevational view of another embodiment of the pulsing container or sphere as depicted here in accordance with this invention wherein a plurality of normally closed slots are provided in the wall of the sphere.
Figures 6, 7:
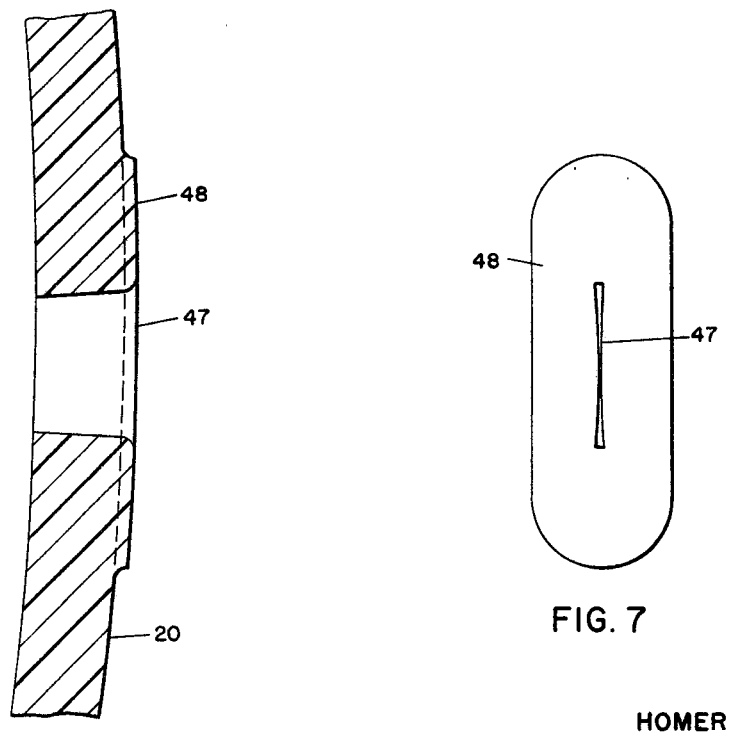
FIG. 6 is an enlarged fragmentary sectional view illustrating the slots as provided in the wall of the sphere in FIG. 5.
FIG. 7 is an external side elevational view of the slot illustrated in FIG. 6.

Referring now to FIGS. 5, 6 and 7, a preferred embodiment of the pulsing sphere 20 of dimension previously given has the mounting flange 35 integrally connected to the resilient body material of the sphere. This body material is a resilient material such as rubber or synthetic rubber with materials, such as Adiprene and Moca, manufactured by E. I. du Pont de Nemours & Co., Wilmington, Del., or materials similarly durable which have a relatively high elongation factor being particularly preferred. The flange material 35 can be of any of a number of noncorrosive metals having structural integrity to threadedly accommodate the metal firing mechanism 27. The primary vent 34 previously mentioned was an aperture about 3 inches in diameter extending through the wall of the sphere 20. Additionally, 30 slots represented by 47, were uniformly spaced over the body of the sphere 20. The slots 47 were 2 inches long interiorly, 2½ inches long exteriorly, were tapered from 0.001 inch at the middle thereof to 0.005 inch at the ends thereof and in each instance, as was the primary vent 34, were provided with a protrusion 48 of about 0.25 inch surrounding the aperture or slots which construction was inducive to increased longevity of the sphere 20. It will be appreciated that the slots 47 which are normally substantially closed give a dispersing or dampening effect as they are forced open to effect a substantial suppression of the bubble or secondary pulse energy in a manner similar to that experienced with impervious pulsing spheres.

The liquid in the sphere 20 may be fresh water or sea water taken from the environment of the seismic exploration. The explosive charge 40 includes the crystalline explosives such as, PETN, RDX, HMX nitromannite, composition "B" consisting essentially of 59.5 cyclonite and 39.5 trinitrotoluene. Although ignition by heat using electric blasting caps was used for the experimental test data, in respect to the feeding of successive explosive charges into the sphere or container for continued automatic operation of the system, this invention provides for features percussion initiating means for initiating each explosive charge as heretofore exemplified. The fluid pressure utilized for feeding the successive explosive charges into the container may include air as the fluid medium but preferably water from the environment of the exploration.

The containers may be varied in size having a volume of from about 5 to about 30 cubic feet. The explosive charges may be varied in explosive strength of from about 0.1 pound to about 0.5 pound equivalent weight percent based on TNT. It will be appreciated, however, that the volume of the container is related to the strength of the explosive charge required for obtaining the desired seismic exploration data. Thus, the greater the charge, the larger the volume for the container to prevent rupture.

The advantages of the invention are multifold and include the following:

(a) Larger explosive charges can be used in a pulsing container than would be possible with a rigid explosive chamber. In this manner, deeper penetration of the generated seismic signal can be expected requiring fewer shots to accummulate equivalent data to that from small charges;

(b) In addition to transforming thrust energy to shock energy as described above, the pulsing sphere sustains pressure over a longer pulse period providing more useful energy in the frequency range used in seismic exploration; and (c) Two-thirds of the objectionable extraneous noise attributable to thrust (bubble) energy has been removed by substantial containment of the gas bubble within the container.

It will be seen, therefore, that this invention may be carried out by the use of various modifications and changes without departing from its spirit and scope.

What I claim and desire to protect by Letters Patent is:

1. A device for generating seismic disturbances in a body of water and providing for utilization of percussion initiatable explosive charges as the seismic energy source, comprising (a) an expandable and contractible container submerged in the body of water;

(b) conduit means in said container for feeding the container with percussion initiatable explosive charges from an exterior installation; and (c) mechanical percussion initiating means for successively initiating each said explosive charge within the container to cause said container to pulse, thereby enhancing the primary explosive pulse and decreasing the secondary pulsations in the body of water.

2. The device of claim 1 in which the container is cylindrical.

3. The device of claim 1 in which the container is spherical.

4. The device as defined in claims 1, 2 or 3 in which the container has a plurality of normally closed slots in the wall thereof, said slots being adapted to open upon initiation of each explosive charge to vent the gases and residue products of the explosion and to thereafter return to normally closed.

5. A system for generating seismic disturbances in a body of water, said system comprising in combination:

(a) storage means for storing a supply of percussion initiatable explosive charges;
(b) an expandable and contractible container submerged in the body of water;
(c) conduit means for individually loading said explosive charges from the storage means to a central position within the container; and
(d) mechanical percussion initiating means for successively initiating each said explosive charge within the container to cause said container to pulse, said system thereby enhancing the primary explosive pulse and decreasing the secondary pulsations in the body of water and operating without need for communication means extending from said container to a remotely disposed firing station for carrying energy for initiation of each said charge.

6. A system of claim 5 in which the storage means includes a seismic recording boat for towing the container.

References Cited

UNITED STATES PATENTS

| | | | |
|---|---|---|---|
| 2,586,706 | 2/1952 | Parr | 181—.5 |
| 3,368,641 | 2/1968 | Cholet et al. | 181—.5 |

RODNEY D. BENNETT, Primary Examiner

DANIEL C. KAUFMAN, Assistant Examiner

U.S. Cl. X.R.

340—7, 12